(12) United States Patent
Salowitz et al.

(10) Patent No.: US 10,337,876 B2
(45) Date of Patent: Jul. 2, 2019

(54) CONSTRAINED-TRANSPORTATION DIRECTIONS

(71) Applicant: Microsoft Technology Licensing, LLC, Redmond, WA (US)

(72) Inventors: Elizabeth Picchietti Salowitz, Seattle, WA (US); Myron Clifford Thomas, Newcastle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/151,246

(22) Filed: May 10, 2016

(65) Prior Publication Data

US 2017/0328728 A1 Nov. 16, 2017

(51) Int. Cl.
*G01C 21/20* (2006.01)
*G01C 21/34* (2006.01)
*G01C 21/36* (2006.01)

(52) U.S. Cl.
CPC .............. *G01C 21/36* (2013.01); *G01C 21/20* (2013.01); *G01C 21/3423* (2013.01)

(58) Field of Classification Search
USPC ........................................................ 701/533
See application file for complete search history.

(56) References Cited

U.S. PATENT DOCUMENTS

| 5,559,707 A | 9/1996 | DeLorme et al. |
| 6,401,034 B1 | 6/2002 | Kaplan et al. |

(Continued)

FOREIGN PATENT DOCUMENTS

| CN | 104658297 | 5/2015 |
| CN | 104794198 | 7/2015 |

(Continued)

OTHER PUBLICATIONS

NPL, Hunter, Timothy et al. The Path Interference Filter: Model Based Low Latency Map Matching of Probe Vehicle Data, University of California at Berkeley, Algorithmic Foundations of Robotics X, pp. 591-607, Springer Berlin Heidelberg (2013) (https://arxiv.org/pdf/1109.1966.pdf).*

(Continued)

*Primary Examiner* — Jean Paul Cass
(74) *Attorney, Agent, or Firm* — Alleman Hall Creasman & Tuttle LLP

(57) ABSTRACT

Constrained-transportation directions are described herein. In one or more implementations, navigation assistance is provided for a user that is traveling on constrained transportation. As part of computing the directions, a determination is initially made that the user is traveling on constrained transportation, which may be restricted to traveling along designated routes and stopping at predetermined stops. Based on this determination, parameters indicative of restrictions to the route the user is traveling onboard the constrained transportation are ascertained, such as parameters describing a "line" of a current vehicle, a schedule of the vehicle, and a current location of the user along the vehicle's known route. Using these parameters, rather than merely a location of the user when the directions are requested, directions to a desired location are computed. In this way, users can be presented directions that account for being on a constrained-route vehicle at the time a route is requested.

19 Claims, 8 Drawing Sheets

(56) References Cited

U.S. PATENT DOCUMENTS

| | | |
|---|---|---|
| 6,707,421 B1 | 3/2004 | Drury et al. |
| 7,391,341 B2 | 6/2008 | Keaveny et al. |
| 7,496,444 B1 | 2/2009 | Fried |
| 7,650,234 B2 | 1/2010 | Obradovich et al. |
| 7,957,871 B1* | 6/2011 | Echeruo ............. G01C 21/3626 |
| | | 104/27 |
| 8,095,303 B1 | 1/2012 | Nesbitt et al. |
| 8,108,501 B2 | 1/2012 | Birnie et al. |
| 8,138,907 B2 | 3/2012 | Barbeau et al. |
| 8,188,859 B1 | 5/2012 | Emigh |
| 8,255,159 B1 | 8/2012 | Bierbaum et al. |
| 8,301,371 B2 | 10/2012 | Sheha et al. |
| 8,400,294 B2 | 3/2013 | Bishop et al. |
| 8,401,786 B2 | 3/2013 | Poppen et al. |
| 8,433,341 B2 | 4/2013 | Dredge |
| 8,467,957 B2 | 6/2013 | Brandis |
| 8,645,050 B2 | 2/2014 | Gontmakher et al. |
| 8,655,582 B2 | 2/2014 | Philbin et al. |
| 8,676,489 B2 | 3/2014 | Cheung et al. |
| 8,779,949 B2 | 7/2014 | Bouillet et al. |
| 8,825,376 B1 | 9/2014 | Szbalski et al. |
| 8,868,343 B1 | 10/2014 | Caine et al. |
| 8,972,177 B2 | 3/2015 | Zheng et al. |
| 9,074,893 B2 | 7/2015 | Kim et al. |
| 9,159,238 B2 | 10/2015 | Manolescu |
| 9,177,472 B2 | 11/2015 | Kim et al. |
| 9,204,251 B1* | 12/2015 | Mendelson ............. G08G 1/14 |
| 9,212,924 B1* | 12/2015 | Salowitz ............ G01C 21/3423 |
| 9,593,957 B2 | 3/2017 | Zheng et al. |
| 2003/0229441 A1 | 12/2003 | Pechatnikov et al. |
| 2005/0021231 A1* | 1/2005 | Matsuda ............... G01C 21/20 |
| | | 701/428 |
| 2006/0149466 A1* | 7/2006 | Kikuchi ............ G01C 21/3423 |
| | | 701/420 |
| 2006/0184314 A1* | 8/2006 | Couckuyt ......... G01C 21/3423 |
| | | 701/533 |
| 2006/0289624 A1* | 12/2006 | Olmos .................... A61F 9/08 |
| | | 235/375 |
| 2007/0129055 A1 | 6/2007 | Ehlers |
| 2007/0291034 A1* | 12/2007 | Dones .................. G06T 19/003 |
| | | 345/427 |
| 2008/0002190 A1* | 1/2008 | Romain ............... G01C 21/005 |
| | | 356/139.01 |
| 2008/0059061 A1 | 3/2008 | Lee |
| 2008/0275646 A1 | 11/2008 | Perng et al. |
| 2008/0319644 A1 | 12/2008 | Zehler |
| 2009/0119001 A1 | 5/2009 | Moussaeiff et al. |
| 2009/0299619 A1 | 12/2009 | Dean et al. |
| 2010/0004805 A1* | 1/2010 | Denis .................. B61L 15/0072 |
| | | 701/19 |
| 2010/0094537 A1 | 4/2010 | Goto et al. |
| 2010/0109918 A1* | 5/2010 | Liebermann ............ G10L 13/00 |
| | | 341/21 |
| 2010/0145922 A1 | 6/2010 | Yoon et al. |
| 2010/0235082 A1* | 9/2010 | Taniyama .......... G01C 21/3423 |
| | | 701/533 |
| 2010/0268450 A1* | 10/2010 | Evanitsky ........... G01C 21/3423 |
| | | 701/533 |
| 2010/0305842 A1 | 12/2010 | Feng |
| 2011/0022304 A1* | 1/2011 | Lee ................... G01C 21/3423 |
| | | 701/533 |
| 2011/0022308 A1 | 1/2011 | Britton |
| 2011/0130956 A1* | 6/2011 | Tracton ............... G01C 21/3644 |
| | | 701/533 |
| 2011/0172909 A1 | 7/2011 | Kahn et al. |
| 2011/0257877 A1 | 10/2011 | Liu et al. |
| 2011/0301832 A1 | 12/2011 | Zheng et al. |
| 2012/0004841 A1* | 1/2012 | Schunder ........... G01C 21/3423 |
| | | 701/412 |
| 2012/0066202 A1 | 3/2012 | Hatazawa et al. |
| 2012/0111222 A1* | 5/2012 | Zambelli .................. A63G 1/00 |
| | | 104/53 |
| 2012/0143501 A1 | 6/2012 | Tang |
| 2012/0221168 A1* | 8/2012 | Zeng .................. G08G 1/09626 |
| | | 701/1 |
| 2012/0310520 A1 | 12/2012 | Kanno et al. |
| 2013/0073202 A1* | 3/2013 | Zheng .................... G01C 21/20 |
| | | 701/468 |
| 2013/0200992 A1* | 8/2013 | Kim ......................... A61H 3/061 |
| | | 340/4.11 |
| 2013/0321466 A1 | 12/2013 | Kocienda |
| 2014/0005921 A1* | 1/2014 | Voronel .................. H04W 4/21 |
| | | 701/423 |
| 2014/0081881 A1 | 3/2014 | Radhakrishnan |
| 2014/0181715 A1 | 6/2014 | Axelrod et al. |
| 2014/0188788 A1* | 7/2014 | Bridgen .................. G06F 16/29 |
| | | 707/609 |
| 2014/0200805 A1* | 7/2014 | Modica ................... G01C 21/20 |
| | | 701/466 |
| 2014/0229107 A1 | 8/2014 | Didjusto et al. |
| 2014/0249747 A1* | 9/2014 | Kosseifi ............ G01C 21/3415 |
| | | 701/428 |
| 2014/0278616 A1* | 9/2014 | Stone .................. G06Q 10/025 |
| | | 705/6 |
| 2014/0372904 A1* | 12/2014 | Liu ..................... G01C 21/3415 |
| | | 715/753 |
| 2015/0006072 A1 | 1/2015 | Goldberg et al. |
| 2015/0015024 A1* | 1/2015 | Cremers ............... G09B 21/003 |
| | | 296/178 |
| 2015/0051832 A1 | 2/2015 | Modica et al. |
| 2015/0070131 A1* | 3/2015 | Beaurepaire ........... G08G 1/005 |
| | | 340/5.8 |
| 2015/0142302 A1 | 5/2015 | Kudo |
| 2015/0204685 A1 | 7/2015 | Gearhart et al. |
| 2015/0285649 A1 | 10/2015 | Zhang |
| 2015/0369623 A1 | 12/2015 | Blumenberg et al. |
| 2016/0061617 A1 | 3/2016 | Duggan et al. |
| 2016/0231129 A1 | 8/2016 | Erez et al. |
| 2016/0260436 A1* | 9/2016 | Lemay .................... G10L 15/28 |
| 2017/0329780 A1 | 11/2017 | Salowitz |
| 2017/0336221 A1 | 11/2017 | Salowitz et al. |
| 2017/0370735 A1 | 12/2017 | Salowitz |

FOREIGN PATENT DOCUMENTS

| | | |
|---|---|---|
| EP | 2244064 A1 | 10/2010 |
| EP | 2750417 | 7/2014 |
| EP | 3012589 | 4/2016 |
| KR | 20160112805 | 9/2016 |

OTHER PUBLICATIONS

"See traffic, transit, bicycling, and terrain on the map", Available at: https://support.google.com/maps/answer/3092439?hl=en, Nov. 22, 2015, 3 pages.

Barker, "Using HERE for Android to get around with transit and on foot", Available at: http://360.here.com/2014/10/22/using-android-get-around-transit-foot/, Oct. 22, 2014, 12 pages.

Welch, "iOS 9 brings public transit directions to Apple Maps", Available at: http://www.theverge.com/2015/6/8/8731953/ios-9-transit-directions-apple-maps-announced, Jun. 8, 2015, 3 pages.

"International Search Report and Written Opinion Issued in PCT Application No. PCT/US2017/030707", dated Sep. 20, 2017, 13 Pages.

"Final Office Action", U.S. Appl. No. 15/157,169, dated Feb. 23, 2018, 17 pages.

"International Search Report and Written Opinion", Application No. PCT/US2017/031461, dated Jul. 27, 2017, 13 pages.

"International Search Report and Written Opinion", Application No. PCT/US2017/030706, dated Sep. 19, 2017, 13 pages.

"International Search Report and Written Opinion", Application No. PCT/US2017/037084, dated Sep. 12, 2017, 15 pages.

"Is there a way to search for stuff along a route?", Google Maps and Earth Help Forum—Available at: https://productforums.google.com/forum/#!topic/maps/1Lal3rlB6ps, Aug. 27, 2013, 2 pages.

"Non-Final Office Action", U.S. Appl. No. 15/157,169, dated Jun. 15, 2017, 15 pages.

(56) References Cited

OTHER PUBLICATIONS

"Non-Final Office Action", U.S. Appl. No. 15/191,402, dated Jul. 18, 2017, 10 pages.
"Notice of Allowance", U.S. Appl. No. 15/157,169, dated Apr. 25, 2018, 5 pages.
"Notice of Allowance", U.S. Appl. No. 15/191,402, dated Dec. 8, 2017, 5 pages.
"RouteFast", Available at: http://www.routefast.com/, Dec. 18, 2014, 1 page.
Foell,"Micro-Navigation for Urban Bus Passengers: Using the Internet of Things to Improve the Public Transport Experience", In Proceedings of the First International Conference on IoT in Urban Space, Oct. 27, 2014, 6 pages.
Fogerty,"Road Trip Planner with Stops: Tools & Tips for a Perfect Road Trip", Available at: http://www.tripit.com/blog/2014/12/road-trip-planner-with-stops.html, Dec. 24, 2014, 4 pages.
Hunter,"The Path Interference Filter: Model-Based Low-Latency Map Matching of Probe Vehicle Data", Algorithmic Foundations of Robotics X, Jun. 20, 2012, 23 pages.
Leber,"A Mapping App That Searches Along Your Route to Plan Exciting (Or Efficient) Trips", Available at: http://www.fastcoexist.com/3035205/a-mapping-app-that-searches-along-your-route-to-plan-exciting-or-efficient-trips, Sep. 10, 2014, 3 pages.
Mitchell,"Search along a route made easy with RouteBoxer", Available at: http://googlegeodevelopers.blogspot.in/2010/05/search-along-route-made-easy-with.html, May 11, 2010, 4 pages.
Perez,"Google Maps Now Lets You Add A Stop Along Your Route, Check Gas Prices", Available at: http://techcrunch.com/2015/10/20/google-maps-now-lets-you-add-a-stop-along-your-route-check-gas-prices/#.f57q8ij:hEA0, Oct. 20, 2015, 5 pages.
Potts,"A Guide for Planning Operating Flexible Public Transportation Services", In Technical Report 140 of Transit Cooperative Research Program, Jul. 23, 2015, 98 pages.
"Non Final Office Action Issued in U.S. Appl. No. 15/151,178", dated Aug. 9, 2018, 13 Pages.

* cited by examiner

CONSTRAINED-TRANSPORTATION DIRECTIONS

BACKGROUND

Advances in navigation assistance technology, which helps individuals get from one place to another, have made its use widespread. Automobiles, mobile phones, and even wrist watches either come equipped with functionality that assists with navigation or can easily be configured to have it by a user. These navigation assistance technologies allow users to plan trips and even provide substantially-real time updates regarding a user's location along a planned route. Further still, when a user takes a wrong turn (e.g., while driving), today's navigation assistance technologies are capable of recalculating a route using a new location of the user, which results from the wrong turn. These technologies are even capable of assisting users to plan routes for trips where users have limited control over operation of the vehicles they ride, such as transit-based routes where the user's movement is limited by the transit vehicles he or she is onboard (e.g., routes involving buses, subways, trains, and so on). However, the approaches used by existing navigation assistance technologies are not optimized to deal efficiently with changing such a route while a user is mid-travel. This is because, typically, navigation technologies assume that a constrained-transportation user, asking for directions, is stationary—using the user's latitude and longitude at the time a route is requested to calculate directions. In the case of transit use, this can result in directions that instruct users to walk to stops that are not in a direction their current transit vehicles are heading, or instruct users to walk to transit stops that are not nearby next stops of the transit vehicles they are currently riding.

Consequently, users may become frustrated with navigation assistance technologies when trying to use them for transportation over which their control is limited. This may cause users to forgo the use of navigation assistance technologies while traveling on vehicles that follow designated routes and a schedule of predetermined stops. Instead, users may rely on their own knowledge of transit systems or may depart such a vehicle at a next stop, and then figure out directions to a desired destination. By simply departing the vehicle at a next stop, however, a user may not be taking an optimized route (e.g., fastest, shortest, cheapest, fewest transfers, and so on) to the desired destination.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for constrained-transportation directions are described herein. In one or more implementations, navigation assistance is provided for a user traveling on constrained transportation, e.g., the user makes a request for directions to a destination while traveling on constrained transportation. An example of constrained transportation may be transit vehicles (e.g., a bus, a train, a subway, and so forth), which are generally restricted to traveling along designated routes and stopping at predetermined stops. As part of computing directions to the destination, a determination is initially made that the user is traveling on constrained transportation. Based on this determination, parameters that are indicative of the route the user is traveling on the constrained transportation are ascertained. Using these parameters, rather than merely a location of the user when the request for directions was made, directions to a desired location using constrained-route vehicles are computed. In this way, users can be presented directions that account for them being on a constrained-route vehicle at the time a route is requested. Additionally, the directions can instruct the user when and where to perform constrained-transportation-specific activities, such as to instruct the user to depart the vehicle at a next stop, request a stop, continue on the vehicle, board a particular vehicle, wait for a vehicle of a different line, and so on.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
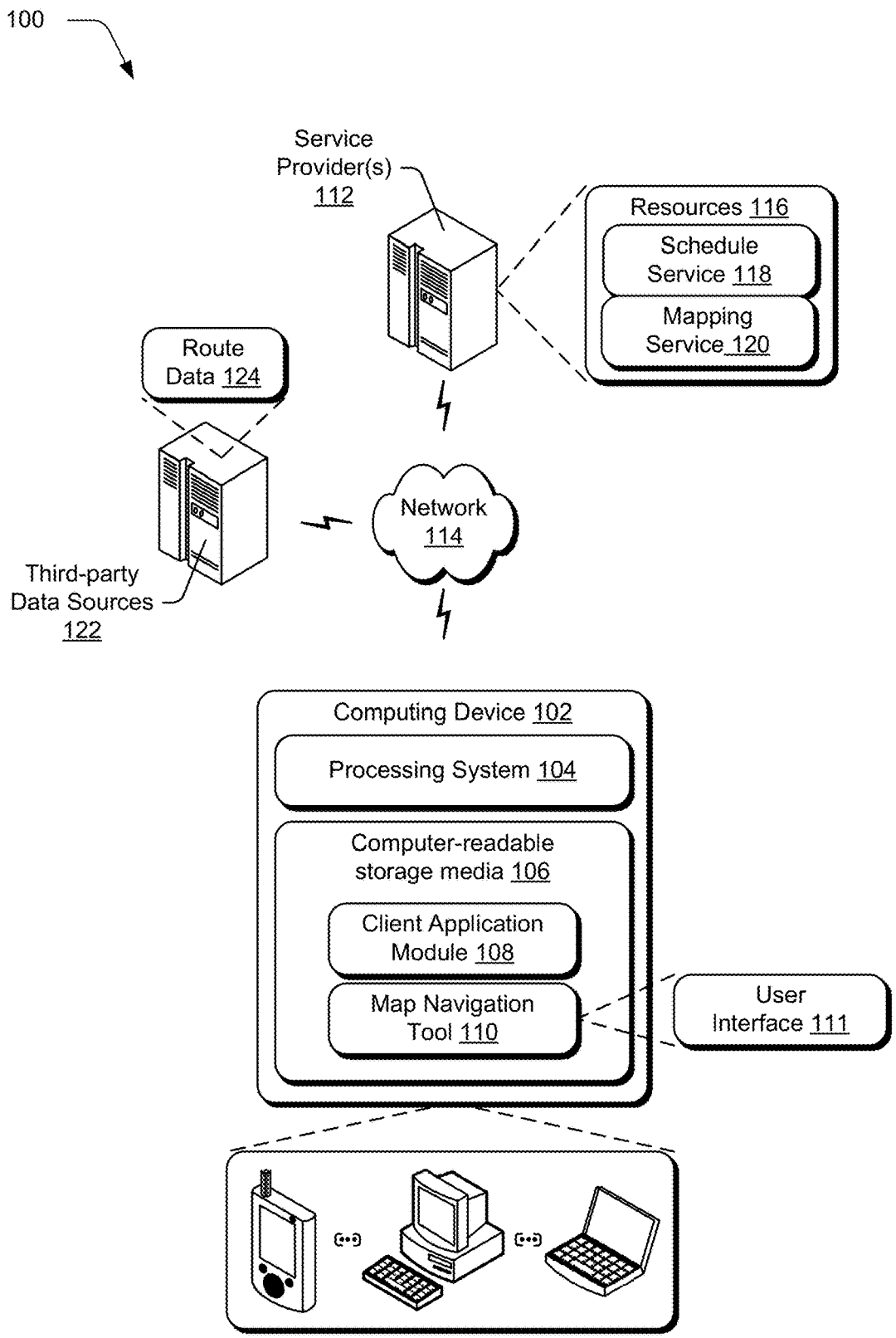
FIG. 1 is an illustration of an environment in an example implementation that is operable to employ techniques described herein.

Generally, navigation assistance technologies are not optimized to deal efficiently with calculating routes for a user onboard a vehicle over which the user has limited control and limited options to reroute since the vehicle follows a designated route. Such vehicles may be referred to herein as "constrained-route vehicles" and may be understood to include vehicles that follow designated routes and have predetermined stops, such as transit vehicles. For instance, navigation assistance technologies are not optimized to deal efficiently with calculating routes for a user that is "on transit" and are also transit-based, e.g., routes that involve walking and riding buses, subways, trains, etc. when possible. Conventional techniques typically fail to determine an optimal (e.g., fastest or shortest) route when recalculating routes for users that miss their stops or users that would like to adjust their routes while on transit, e.g., to go to a different destination than originally planned or make a stop at some intermediate destination before continuing on to the originally planned destination. Largely, this is because existing technologies base the computation of trip plans and route recalculations for users of constrained-route vehicles on starting points that correspond simply to a fixed location, e.g., as determined by global positioning system (GPS) coordinates. In other words, the computations performed by conventional techniques assume that a user requesting a route while on a constrained-route vehicle is stationary when the request is made.

This can lead to scenarios in which directions computed according to conventional techniques instruct a user riding a constrained-route vehicle to walk to a stop opposite a direction the vehicle is heading, such as behind the vehicle when a next stop or opportunity to transfer is actually ahead. Directions computed according to conventional techniques can also instruct a user to walk to a stop near a current location of the vehicle, but not nearby its next stop. Consequently, users may become frustrated with navigation assistance technologies when trying to use them on constrained-route vehicles. This may cause users to forgo the use of navigation assistance technologies in scenarios in which users have limited control, if any, to control routes of constrained-route vehicles.

Techniques for constrained-transportation directions are described herein. In one or more implementations, navigation assistance is provided for a user onboard a vehicle in which his or her movement is constrained to the operation of the vehicle, e.g., a constrained-route vehicle. The vehicle may, for instance, follow a designated route and stop at predetermined locations. However, a user's control over the vehicle and options to reroute the vehicle are limited since the vehicle follows the designated route. Examples of constrained transportation include transit use because transit vehicles (e.g., buses, trains, subways, ferry boats, light rail cars, and so forth) follow designated routes and generally have limited stops at predetermined locations. Other examples of constrained transportation can include vanpools, carpools, shuttles, and so on. While on a constrained-route vehicle, a user's movement is largely limited according to the designated route and vehicle's schedule. In general, the navigation assistance provided using the techniques described herein is constrained-transportation-based, and may be provided to users via some device, such as via a mobile phone, a wrist watch, computing glasses, a tablet device, and so on. Further, the navigation assistance may be provided by launching a mapping application, initiating a search with a search engine, querying a digital assistant (an example of which is Microsoft Cortana™), and so forth. As part of computing directions for a constrained-transportation user, a determination is initially made that the user is on a vehicle over which the user has limited control, if any. Based on this initial determination, parameters that describe operation and route limitations of the vehicle the user is onboard are ascertained, such as describing a corresponding transit "line" of the vehicle, a schedule for the vehicle, a current location of the user along the vehicle's known route, and so forth.

Using these parameters, rather than merely a location of the user when the direction request was made, directions to a desired location using constrained-route transportation are computed. In this way, the directions presented to users account for them being on a constrained-route vehicle, e.g., the actions the user can perform are constrained by the operation of the vehicle. For instance, the parameters are used to determine a schedule for the constrained-route vehicle the user is onboard. When and where the constrained-route vehicle stops or can be stopped is thus ascertained. Given that these parameters describe the schedules and stops of other constrained-route vehicles, such as vehicles of other transit lines, the techniques can also ascertain when and where other constrained-route vehicles stop. The parameters describing operation of the current constrained-route vehicle, as well as its current location along a known route and parameters that describe operation of other constrained-route vehicles enable the calculation of optimized routes (e.g., fastest, shortest, cheapest, fewest transfers, and so on) for a user utilizing constrained transportation. Thus, the directions can instruct the user when and where to perform constrained-transportation-specific activities, such as to instruct the user to depart the vehicle at a next stop, request a stop, continue on the vehicle, board a particular vehicle, wait for a vehicle of a different line, and so on.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the examples procedures and details.

Example Environment

FIG. 1 is an illustration of an environment 100 in an example implementation that is operable to employ techniques described herein. The illustrated environment 100 includes a computing device 102 which has a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online services, and so forth.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The computing device 102 may also include or make use of a map navigation tool 110 that represents functionality operable to implement techniques related to mapping as described above and below, including but not limited to navigation, transit behavior recommendations (e.g., recommending when to request stops), route searches, point of interest searches, and other mapping operations. The map navigation tool 110 may be implemented as a software module, a hardware device, or using a combination of software, hardware, firmware, fixed logic circuitry, etc. The map navigation tool 110 may be implemented as a stand-alone component of the computing device 102 as illustrated. In addition or alternatively, the map navigation tool 110 may be configured as a component of the client application module 108, an operating system, or other device application. For example, map navigation tool 110 may be provided as a plug-in and/or downloadable script for a browser. Map navigation tool 110 may also represent script contained in or otherwise accessible via a webpage, web application, or other resources made available by a service provider. In one or more implementations, map navigation tool 110 may be accessible through a digital assistant, such that the digital assistant can utilize the functionality of the map navigation tool 110 to provide users with information corresponding to mapping-related techniques.

In accordance with techniques described herein, the map navigation tool 110 is operable to access and utilize various available services and sources of data to facilitate navigation and mapping activities. For instance, the map navigation tool 110 performs operations to access device location data, obtain map data, access schedule data for constrained-route vehicles, generate real-time vehicle operation estimations, generate maps, compute routes, conduct searches based on input criteria, rank and output search results, and so forth. Maps, search results and other outputs generated via the map navigation tool 110 may be exposed via a user interface 111 output by the map navigation tool 110 or another application for which the map navigation tool 110 is configured to provide functionality for mapping and navigation. Map navigation tool 110 is further configured to generate constrained-transportation directions for a user that is onboard a vehicle over which he or she has little, if any, operational control, e.g., a transit vehicle such as a bus, subway, train, and so on. For instance, the map navigation tool 110 may determine that a bus rider misses a bus stop, and automatically recalculate transit-based directions to the rider's desired destination based on having missed the stop. In another example, a rider of a constrained-route vehicle may request to stop at an intermediate destination, and make the request while riding to a previously entered final destination. The map navigation tool 110 may recalculate constrained-transportation directions to navigate the user from a current location along a designated route of the vehicle, to the intermediate stop, and then to the final destination. To do so, the map navigation tool 110 may cross reference schedule data for a current constrained-route vehicle as well as schedule data for other lines of constrained-route vehicles, e.g., lines having routes that are useable to carry the user to determined destinations. Details regarding these and other aspects are discussed in relation to the following figures.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

By way of example, the service provider is illustrated as including a schedule service 118 and a mapping service 120. The map navigation tool 110 is configured to invoke the schedule service 118 and/or mapping service 120 to generate constrained-transportation directions for a user that requests the directions while onboard a constrained-route vehicle as described above and below. The schedule service 118 may operate to provide schedules for transit vehicles and lines, as well as other forms of transportation where the user has limited control over operation of a current vehicle, which may be on a designated route, having limited designated stops. For example, the schedule service 118 can provide information for a transit line that indicates the times a vehicle of the line is scheduled to arrive at and depart from different stops of the line. The information provided by the schedule service 118 may also describe current locations of a line's vehicles, locations of stops, fares, vehicle types, an indication of how full a vehicle is, real-time operation, and so on. In general, users may be able to utilize this information to plan their own routes using constrained-route vehicles. The mapping service 120 represents functionality operable to access and obtain navigation and mapping data including map views, route information, distances, waypoints, navigation instructions, and so forth. The schedule service 118 and the mapping service 120 may each access and rely upon data from various third-party data sources 122. Such data may include route data 124 as illustrated. The data may additionally include collections, social network data, POI data, map data/services, and other data that may be used to generate navigation and mapping data for use by clients in connection with providing constrained-transportation directions.

Figure 2:
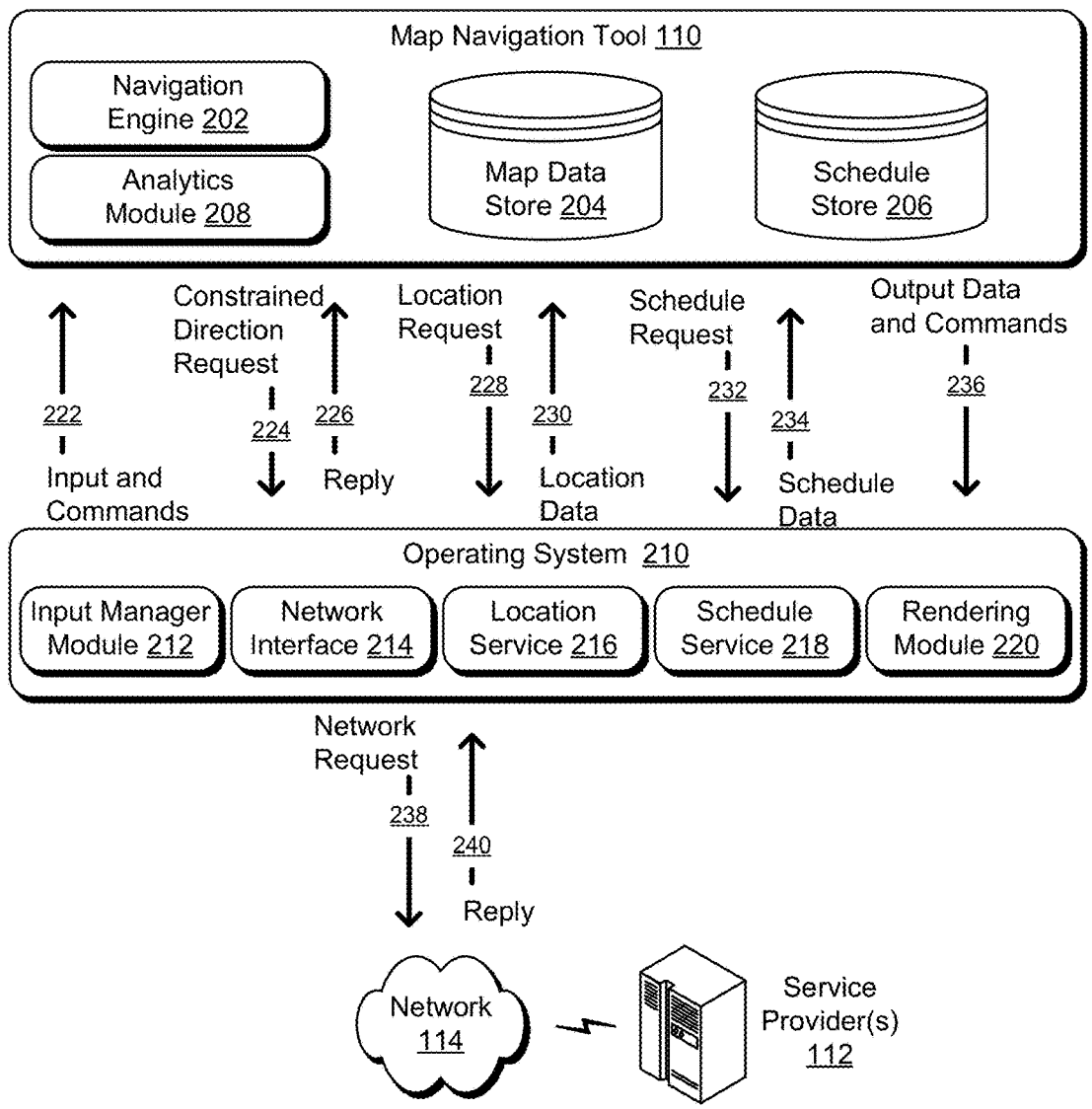
FIG. 2 is a diagram depicting an example configuration of a map navigation tool in accordance with one or more implementations.

In this context, FIG. 2 depicts generally at 200 an example configuration of a map navigation tool 110 in accordance with one or more implementations. In this example, the map navigation tool 110 includes a navigation engine 202, map data store 204, schedule store 206, and analytics module 208 operable in conjunction with an operating system 210 to provide navigation and mapping functionality. A client computing device (e.g., smartphone, mobile device or other computing device 102) can execute software for the map navigation tool 110 and the operating system 210 organized according to the depicted example to provide various navigation/mapping functionality including at least constrained-transportation directions as discussed in this document.

The operating system 210 manages user input functions, output functions, storage access functions, network communication functions, and other functions for the device. The operating system 210 provides the map navigation tool 110 access to such functions through various components and interfaces. For instance, the operating system 210 includes an input manager module 212 for input processing, a network interface 214 for networking, a location service 216 for location tracking through GPS or otherwise, a schedule service 218 for constrained-route vehicle schedule processing through schedule table consultation or otherwise, and a rendering module 220 for rendering (e.g., rendering visual output to a display, generating voice output for a speaker).

A user can generate user input that affects map navigation. In particular, input manager module 212 represents functionality to obtain and process various types of input including touchscreen input, button or key presses and voice input. Thus, the OS includes functionality for recognizing taps, finger gestures, etc. to a touchscreen from tactile input, recognizing commands from voice input, button input or key press input, and creating messages that can be used by map navigation tool 110 and/or other software. Input and commands 222 generated based on input are conveyed to the map navigation tool 110 for handling via the navigation engine 202.

The navigation engine 202 represents functionality to implement various navigation and mapping operations. The navigation engine 202 may rely upon cached map data and/or map database that is stored locally in the map data store 204. The navigation engine 202 may also rely upon cached schedule data and/or schedule database that is stored locally in the schedule store 206. Further, the navigation engine 202 may invoke the analytics module 208 to perform analysis including input interpretation, vehicle schedule coordination, generation of navigation instructions, route calculation, and so forth. In conjunction with the analytics module 208, the navigation engine 202 provides functionality to form constrained direction requests 224 and obtain replies 226. The constrained direction requests 224 may be directed to appropriate network resources via the network interface 214. Additionally, the navigation engine 202 may make location requests 228 and obtain location data 230 from the location service 216 based on the requests. The navigation engine 202 may also make schedule requests 232 and obtain schedule data 234 from the schedule service 218 based on the requests. The location data and schedule data are used to inform navigation and mapping operations, such as showing a current position, determining estimated times of arrival and departure, computing distances, computing stops, routing calculations, and so forth.

For navigation, the navigation engine 202 considers a current view position and any input that indicates a desired change in the view position, map data and location data. From this information, the navigation engine 202 determines a view position and provides the view position as well as location data and map data in the vicinity of the view position for rendering via the rendering module 220. In particular, the navigation engine 202 sends output data and commands 236 to direct operation of the rendering module 220 to cause corresponding output via a user interface 111, or otherwise. The location data 230 indicates a current location (of the computing device 102) that aligns with the view position, or the view position can be offset from the current location. The navigation engine 202 gets current location data for the computing device from the location service 216, which gets the current location data from a local component of the computing device. For example, the location data can be determined based upon data from a global positioning system (GPS), data received from a current constrained-route vehicle (e.g., over some short-range communication technology such as Bluetooth™), by triangulation between towers of a cellular network, by reference to physical locations of Wi-Fi routers in the vicinity, obtain data from a user profile associated with a transit card or pass (an example of which is the ORCA™ card in the Seattle area), obtain data from a database or service that maintains information about scanned badges that can be used for transportation (e.g., a company badge that can be scanned to ride company transit) or scanned tickets (e.g., maintains information about scanned paper tickets), or by another mechanism.

As noted, the navigation engine 202 can obtain at least some map data for a map from a map data store 204. In general, the map data can be photographic image data or graphical data (for boundaries, roads, etc.) at various levels of detail, ranging from high-level depiction of states and cities, to medium-level depiction of neighborhoods and highways, to low-level depiction of streets and buildings. Aside from photographic data and graphical data, the map data can include graphical indicators such as icons or text labels for place names of states, cities, neighborhoods, streets, buildings, landmarks or other features in the map. Additionally, the map data can include distances between features, route points (in terms of latitude and longitude) that define a route between start and destination points, text directions for decisions at waypoints along the route (e.g., turn at Sandy Shores, Ln), and distances between waypoints along the route. The map data can provide additional details for a given feature such as contact information (e.g., phone number, Web page, address), reviews, ratings, other commentary, menus, photos, advertising promotions, or information for games (e.g., geo-caching, geo-tagging). Links can be provided for Web pages, to launch a Web browser and navigate to information about the feature. The map data store 204 may be configured to cache recently used map data and/or maintain a local map library. As needed, the map data store 204 accesses additional or updated map data from local file storage or from network resources. The OS mediates access to the storage and network resources.

As additionally noted, the navigation engine 202 can obtain at least some schedule data for providing directions involving constrained-route vehicles from the schedule store 206. In general, the schedule data is capable of indicating locations of designated routes for constrained route vehicles (using location coordinates), including when and where those vehicles are scheduled to stop to drop off and pick up passengers. With reference to transit-based routes, for instance, the schedule data is capable of indicating locations of stops along a transit line (e.g., in terms of latitude and longitude, cross street indicators '$4^{th}$ and Pine', landmarks, stations, etc.), requestable stops versus automatic stops, times that transit vehicles of the line are scheduled to arrive at and/or depart from a particular stop throughout a day, approximate travel duration between stops (e.g., in terms of both time and distance), and so forth. The schedule data is also capable of indicating real-time operation information, such as whether a vehicle of a line is ahead or behind schedule, whether the delay or advance in schedule applies to each vehicle of the line or just one, current passenger load relative to capacity of a vehicle, current locations of vehicles along their designated routes, and so on. The schedule store 206 may be configured to cache recently used schedule data and/or maintain a local schedule library. As needed, the schedule store 206 accesses additional or updated schedule data from local file storage or from network resources. Like with the map data store 204, the OS mediates access of the schedule store 206 to the storage and network resources.

For example, to determine directions for a route, the map navigation tool 110 provides a start point (typically, a current location that corresponds to a time the directions are requested) and a point for a destination (e.g., an address or other specific location) as part of a request for map and schedule data. Unlike conventional techniques, however, it is also determined that a user is on a constrained-route vehicle at a time of the request. In other words, a determination is made that the user is on a vehicle over which he or she has limited control and limited options to reroute since the vehicle follows a designated route, having predetermined stops. Accordingly, the map navigation tool 110 may also provide information indicating that the user is on a constrained-route vehicle as part of the request for map and schedule data. The device OS conveys the request over a network 114 as a network request 238 to one or more services implemented by service providers 112. The network request 238 is processed to generate and return a reply 240 with surface layer data, route points that define a route utilizing constrained-route transportation (e.g., transit), text directions for decisions at waypoints along the route (e.g., when and where to depart from a current vehicle, walking directions to a next stop or destination, next vehicles or lines to board at stops, distances and times between waypoints along the route, and/or other map and schedule data included in the reply 240). The OS in turn conveys the reply 240 with the various map and schedule data as a reply 226 for handling via the map navigation tool 110. The map and schedule data may be stored within the map data store 204 and the schedule store 206, respectively, and/or communicated directly to the navigation engine 202 or analytics module 208.

As another example, as a user travels along a route, the map navigation tool 110 gets additional map data from the map data store 204 for rendering. The map data store 204 may cache detailed map data for the vicinity of the current location, using such cached data to incrementally change the rendered views. The map navigation tool 110 can pre-fetch map data along a route, or part of the route. Thus, as the rendered map views are updated to account for changes to the current location, the map navigation tool 110 often updates the display without the delay of requesting/receiving new map data from a server. As needed, the map data store 204 requests additional map data to render views. In addition to rendering map views and a current location, the map navigation tool 110 can display locations of other vehicles within map views, such as transit vehicles of other lines. For example, the map navigation tool 110 can cause animation of a vehicle that corresponds to a leg of the user's route subsequent to a current leg, e.g., a next vehicle along the user's calculated route to some destination.

The rendering module 220 processes the view position, location data, map data and schedule data, and renders a view of the map via a user interface 111 or otherwise. Depending on the usage scenario, the rendering module 220 renders map data from local storage, map data from a network server, or a combination of map data from local storage and map data from a network server. The rendering module 220 may also render schedule data (e.g., in the form of scheduled stops, indications of other lines, countdowns to stops, and so forth) from local storage, from a network server, or a combination of local storage and network server. In general, the rendering module 220 provides output commands for the rendered view to the device OS for output on via a display, speakers, and/or other output device. The map navigation tool 110 reacts to changes in the location of the computing device and/or user input that indicates a change in view position, a change in the top item in a list of directions for a route, or other changes. The map navigation tool 110 also reacts to changes in the location of the constrained-route vehicle and/or its schedule. The rendered map view is updated based on the changes. Indications of a route including stops and transfers as well as intermediate destinations that are exposed in connection with a map view are also updated as the view changes.

Having considered an example environment, consider now a discussion of some example details of techniques to provide constrained-transportation directions in accordance with one or more implementations.

Constrained-Transportation Direction Details

Example User Interfaces

Figure 3:
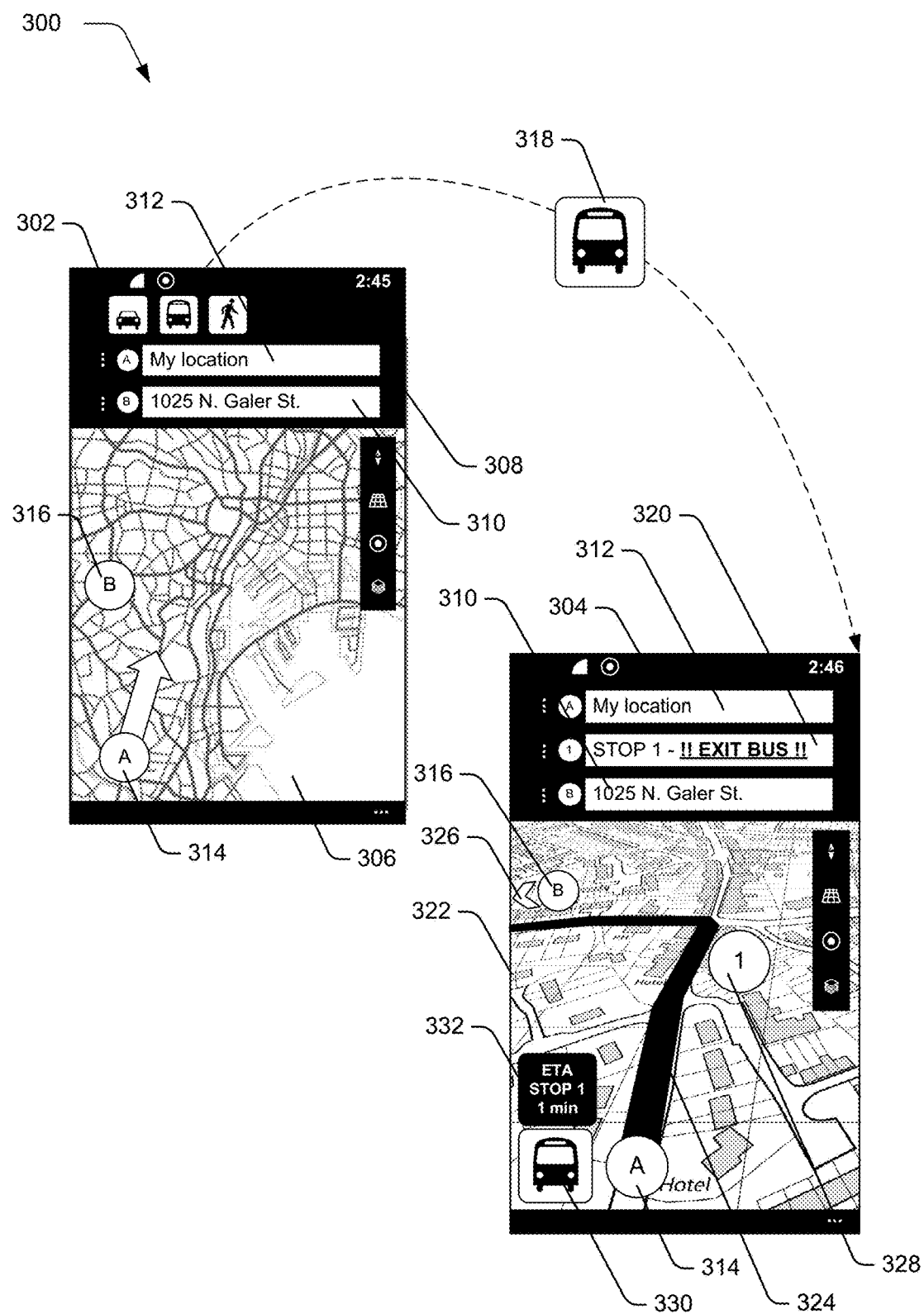
FIG. 3 illustrates an example user interface of a map application capable of giving constrained-transportation directions in accordance with one or more implementations.
Figure 4:
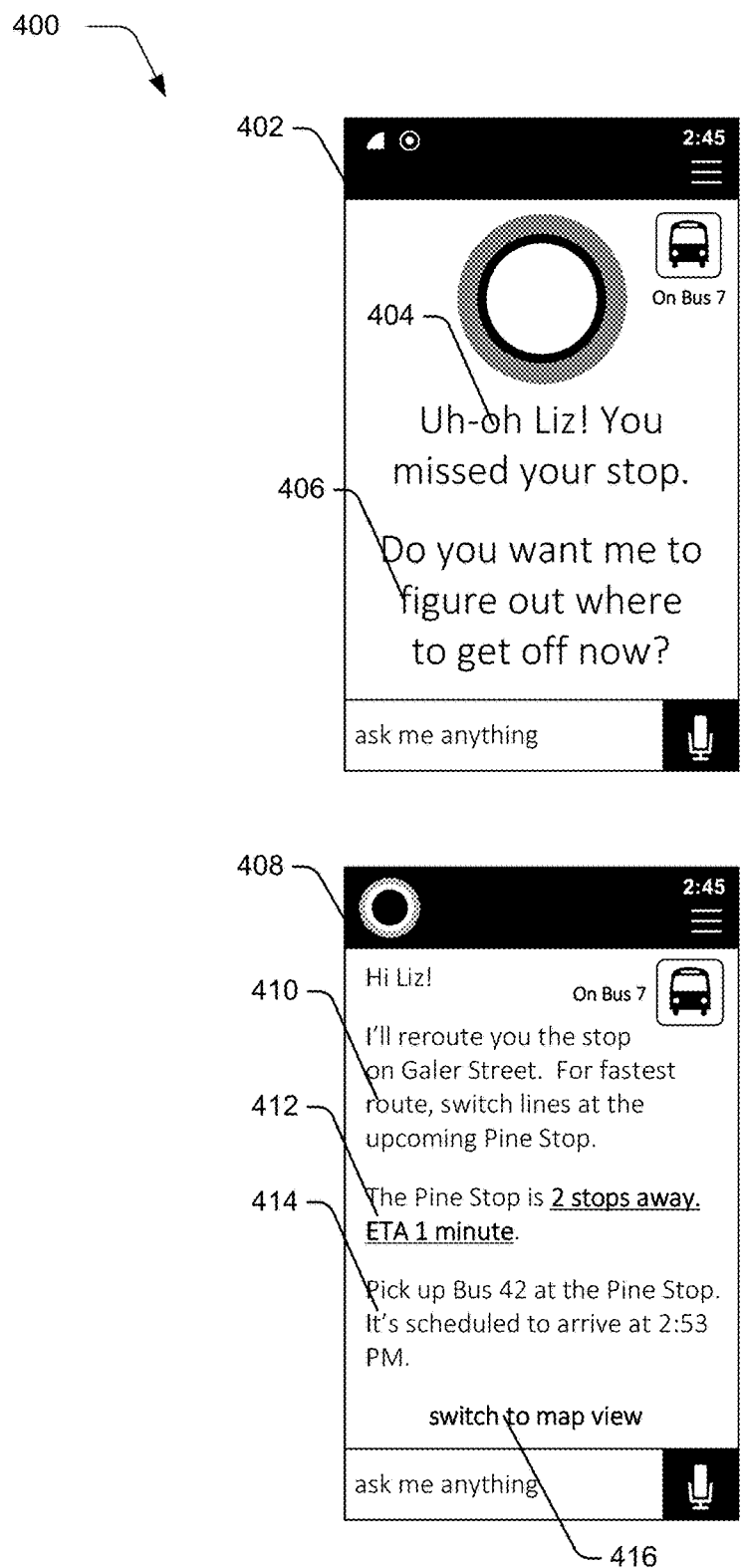
FIG. 4 illustrates an example user interface of a digital assistant capable of assisting a user with constrained-transportation directions in accordance with one or more implementations.

This section describes some example details of constrained-transportation directions in accordance with one or more implementations in relation to some example procedures, scenarios, and user interfaces of FIGS. 3-4. FIG. 3 depicts an example, generally at 300, of a user interface for a map application capable of giving constrained-transportation directions in accordance with one or more implementations. The user interface may be displayed, for example, via a mobile phone display. In this way, a user may interact with the user interface (e.g., through touch input) to utilize functionality of the map application, such as to enter destinations (intermediate and final) and obtain step-by-step directions to those destinations. In particular, the example 300 depicts the user interface of the map application in a destination selection mode 302 and a step-by-step mode 304.

The destination selection mode 302 represents functionality of the map application that enables users to enter way points (e.g., starting point, intermediate destinations, and ending destinations) for directions. The destination selection mode 302 is capable of displaying a map view 306 and includes way point entry portion 308. The way point entry portion 308 allows a user to enter one or more destinations and to search for potential destinations, such as through destination input component 310. In this case, the entered destination corresponds to "1025 N. Galer St." Although the destination input component 310 is illustrated as a single text entry field, destination input components may be configured as any user interface component capable of receiving input from a user to specify a destination. By way of example and not limitation, a destination input component may be configured to receive a voice command, there may be multiple text entry fields to enter multiple destinations, a destination input component may allow a user to simply touch a location on a displayed map to get directions to that location, the destination input component may allow a user to touch location markers that are indicative of search results (e.g., restaurants, grocery stores, bars, coffee shops, parks, landmarks, scenic views, and so on), and so forth.

The destination selection mode 302 also includes a starting location component 312 in the illustrated example 300. The starting location component 312 allows a user to enter a location for starting a route. In addition, the starting location component 312 may indicate "My location" as in the illustrated example 300. This is indicative of an automatically determined current location of the user, which can be determined and updated over time in the manners described above.

In the example 300, the map view 306 includes starting location marker 314 and destination marker 316. The starting location marker 314 and the destination marker 316 correspond to the locations indicated by the starting location component 312 and the destination input component 310, respectively. The starting location marker 314 is illustrated with an arrow to show a direction in which the user is determined to be currently heading or moving. At a time input is received via the destination input component 310 to specify a destination, the user may already be heading to some other destination (not shown) via a constrained-route vehicle, e.g., home, which is known to the map application. Thus, the arrow illustrated with the starting location marker 314 may indicate the user's location along a known route to the that previous destination. The new request may be effective to add an intermediate destination (e.g., 1025 N. Galer St.) to the route. Based on submitting a request, directions may be computed according, in part, to the user's current location and the entered destination, intermediate or otherwise.

As part of computing the directions, a determination is initially made as to whether the user is currently on a constrained-route vehicle. For instance, a determination is made as to whether the user is currently riding a bus, subway, train, or the like. This determination is represented in the illustrated example 300 by transit indicator 318. As discussed above, functionality of a device associated with the user, and that is used to display the user interface of the example 300, can enable this determination to be made. For example, the device may receive a signal from the transit vehicle currently being ridden by the user (e.g., over some short-range communication technology, such as Bluetooth™) Alternately or in addition, the device may have displayed an electronic ticket that was scanned when the user boarded the transit vehicle or a movement pattern indicative of riding transit may be detected. Further still, the user may have indicated through the user interface that he or she is on transit, such as by selecting an on-transit option (in contrast to a driving option or pedestrian option), affirmatively answering a question like "Are you currently riding transit?", and so on. A determination as to whether a user is riding a constrained-route vehicle may be made in a variety of different ways without departing from the spirit or scope of the techniques described herein.

In connection with a determination that the user is currently onboard a constrained-route vehicle, particular information associated with the user's status onboard such a vehicle is collected. Typically, constrained-route vehicles, such as transit vehicles, are part of a "line," e.g., a set of vehicles that have a designated route, usually between a starting point and an ending point, stops at predefined locations along the route to allow passengers to leave and board the vehicles, and scheduled times for arriving at and departing from the stops. In some scenarios, multiple lines may stop at a given stop, however, the entirety of their routes is not generally the same, e.g., lines may have different starting and ending points, stay on the same route as another line for a portion of the route, stop at fewer stops along the route (e.g., an express line) than a different line that stops at each of them (e.g., a local line). Oftentimes lines of transit vehicles are expressed as colors, letters, or numbers, such as the 'Gray Line', the 'A Line', the '7', and so forth.

Operation of each line may be described by parameters. These parameters may describe schedules for the line, including the locations of stops associated with the line and when throughout the day the line's vehicles arrive at and depart from those stops. Broadly speaking, these parameters may describe restrictions of a user's movement due to being a passenger of a constrained-route vehicle, e.g., that the user's route is limited to the designated route of the constrained-route vehicle, that the user can change routes by exiting the vehicle at predetermined stops of the vehicle, and so forth. The parameters may also describe travel times between stops, such that an estimated time on a vehicle between two of its stops may be determined. The time may be "estimated" insofar as the scheduled arrivals and departures from a particular stop may vary based on traffic, weather, or other conditions capable of affecting travel times.

In addition to describing line characteristics of the current vehicle, parameters may also describe actual operation of the current vehicle. For example, parameters that describe real-time operation of the vehicle, may be collected, such as parameters that describe a current location of the vehicle, a timeliness relative to a schedule of the corresponding line, a number of passengers aboard (relative to the vehicle's capacity), a current fare, and so forth. Using these parameters, along with parameters that describe operation of other constrained-route vehicles and corresponding lines, constrained-transportation directions can be ascertained for the user. A current location and current time may also be used to determine the directions for the user.

In addition to using parameters that describe constrained-route vehicle operation (both scheduled and real-time), a determination of the directions also accounts for the status of the user as being onboard a vehicle over which the user has limited control, if any. By this it is meant that directions are not simply computed for some static starting location from which the user can control travel. Rather, the directions are calculated in a manner that assumes the user is moving on the corresponding constrained-route vehicle while the directions are being calculated. This way, the directions do not instruct the user to exit the vehicle at a stop he or she will have missed once the directions are calculated and presented. To do so, the map navigation tool 110 may determine an approximate amount of time it will take to calculate a route to a next destination. Given this amount of time and the parameters describing operation of the current vehicle, the map navigation tool 110 is also configured to determine how much further the current vehicle will travel along its designated route before the directions are presented. Thus, the map navigation tool 110 can disregard stops of the vehicle between a location where the user requested directions and an estimated location of the vehicle when the directions are presented.

The map navigation tool 110 determines a next stop for the user as one ahead in the designated route of the vehicle. In other words, once the user is presented with the directions, a stop the user is directed to take will be upcoming, e.g., the user will not have already passed the stop when the directions are presented. In a similar manner, the map navigation tool 110 determines transfers from the current vehicle to vehicles of other lines. For instance, the map navigation tool 110 can disregard transfers to stops of other lines that are not near the upcoming stop or that are scheduled to depart while the user is still on the current vehicle (or too soon after the user exits the current vehicle to casually walk to the transfer stop). The map navigation tool 110 can thus account for a current location of a user onboard a constrained-route vehicle, as well as schedules (or actual operation) of other lines to which the user may transfer. The map navigation tool 110 can do this when determining legs of a constrained-transportation route.

Furthermore, the map navigation tool 110 can determine an optimized route between the determined upcoming stop and the chosen destination of the user, taking the current location and schedules (or actual operation) of the other lines into account. As used herein, an "optimized" route refers to a route that is computed to be optimized based on some factor, such as a shortest route in terms of distance or a fastest route in terms of duration from the current location of the user to a final destination. The route may be optimized based on still other optimization factors without departing from the spirit or scope of the techniques described herein. By way of example and not limitation, a route may be optimized to have a fewest number of transfers (e.g., for a user that has difficulty making transfers due to a disability, injury, or for other reasons), to be the cheapest route (e.g., if the user is on a budget), and so forth.

With reference again to the user interface in the example 300, the step-by-step mode 304 is configured to display instructions that instruct the user how to follow the determined optimized route. The step-by-step mode 304 is illustrated having the destination input component 310 and the starting location component 312. In contrast to the destination selection mode 302, however, the step-by-step mode 304 also includes intermediate step indicator 320. In this particular example, the intermediate step indicator 320 indicates a stop where the user is to depart a current transit vehicle, indicating "STOP 1—!! EXIT BUS !!". Once the user departs the current transit vehicle, an indication of a next step may be displayed, such as one instructing the user to catch another transit vehicle on some other line to reach the destination. Although one step is depicted in the illustrated example, it should be appreciated that the step-by-step mode 304 may display more steps than merely a next one. By way of example, the step-by-step mode 304 may display two upcoming steps (e.g., exit bus, catch the 'red' line— arriving at 2:52), a user defined number of upcoming steps, each step of the determined route, each upcoming step of the determined route, some other number of steps, and so forth.

Additionally, the step-by-step mode 304 is illustrated with route view 322, which displays the route determined for the user with route indicator 324 overlaying a map to indicate a direction the user is heading. In this case, the route view 322 is a three dimensional (3D) based view, in contrast to a bird's eye view (e.g., looking straight down on the map). Although illustrated as a 3D-based view, the route view 322 may be configured in a variety of different ways without departing from the spirit or scope of the techniques described herein. The route view 322 may be configured to display a map using a bird's eye view, a satellite view, or an animated view, for example. Here, the route view 322 includes the starting location marker 314 and the destination marker 316 to indicate those locations within the route view 322. It should be noted that the destination marker 316 is depicted with an arrow 326, which indicates that the destination is not within the portion of the map currently presented by the route view 322. Rather, the destination is located at some other portion of the map, and the arrow 326 provides an indication as to where the destination lies relative to the portion of the map presented in the route view 322. In addition to the starting location marker 314 and the destination marker 316, the route view 322 also includes step marker 328. The step marker 328 corresponds to the step indicated by the intermediate step indicator 320. In the illustrated example 300, the step marker 328 indicates a location of 'STOP 1' where the user is instructed to 'exit' the current vehicle (e.g., the 'bus').

The route view 322 also includes current transportation mode indicator 330 and countdown to next step indicator 332. The current transportation mode indicator 330 is configured to indicate a current mode of transportation a user is taking. In the illustrated example, the current transportation mode indicator 330 is indicative of transportation via transit, in particular, on a bus. The current transportation mode indicator 330 may be configured to represent different types of constrained-route vehicles (e.g., bus versus subway versus train), or one indicator may simply be used for any type of transportation that is constrained to some designated route with predetermined stops (e.g., a same indicator is used for transportation via bus, subway, and train). The current transportation mode indicator 330 may also be configured differently to represent driving in a car, walking, riding a bicycle, and so forth. The countdown to next step indicator 332 represents a countdown to the next upcoming step. It may be configured to represent a time until the user is to take the next step, as illustrated, e.g., estimated time of arrival (ETA) to 'STOP 1' 1 minute. In addition or alternately, the countdown to next step indicator 332 may indicate a distance until the next step, or a number of stops (e.g. Exit in 2 Stops, Exit Next Stop, etc.) until the next step, and so forth.

In general, the user interface illustrated in the example 300 is described with reference to a scenario in which the user enters a destination (e.g., 1025 N. Galer St.) while traveling on a transit vehicle. However, this user interface may also be displayed in a scenario in which the user misses a stop while riding any constrained-route vehicle. By way of example, the user may be on such a vehicle while heading to the indicated destination (e.g., 1025 N. Galer St.) and miss a stop he or she is instructed to make. In this example, a request for new directions can be made automatically. Additionally, the map navigation tool 110 can recalculate a constrained-transportation route for the user, which involves determining that the user is on a constrained-route vehicle as discussed above, and collecting parameters indicative of operation of the current vehicle as well as vehicles of other lines that can be used to carry the user to the indicated destination. These new directions, calculated based on the determination that the user has missed a step, can thus be calculated and presented in the user interface via the step-by-step mode 304.

Constrained-transportation directions may also be used in connection with a digital assistant. FIG. 4 depicts an example, generally at 400, of a user interface for a digital assistant capable of assisting a user with constrained-transportation directions in accordance with one or more implementations. The example 400 illustrates a scenario similar to the one discussed just above in which the user misses a stop. In this scenario, however, the digital assistant is used for directions rather than the map application. By way of example, a user may have initially invoked the digital assistant for transit-based directions to a destination instead of using a map application, e.g., using voice commands such as "take me to 1025 N. Galer St." Alternately or in addition, the digital assistant may be automatically invoked when it is determined that a deviation from a determined route to a destination has occurred (e.g., missed a stop).

Regardless of how the digital assistant is initially invoked, the user interface for the digital assistant can be configured in alert mode 402 to alert the user about a deviation from the determined route. In the illustrated example, the alert mode 402 includes a message 404 in text that is configured to alert the user to the deviation. Although the message 404 is illustrated as being text based, the alert mode 402 may alert the user to the deviation in other ways, such as using other visual indicators, audible indicators (e.g., beeping, the digital assistant saying the message, and so on), tactile indicators (e.g., vibrating), and so forth. The alert mode 402 also includes a message 406 that prompts the user for initiating a resolution, e.g., "Do you want me to figure out where to get off now?" The user may respond to the prompt in some fashion, such as verbally (e.g., saying "yes" or "no") or by selecting a button (not shown).

The user interface for the digital assistant may also be configured in rerouting mode 408. The digital assistant, when presenting the user interface in the rerouting mode 408, may include an indication 410 that an optimized route utilizing constrained-route vehicles (e.g., transit) has been calculated for the user, and instructions for the user to follow to proceed along that route. The user interface for the digital assistant may also include a countdown to next step indication 412 (similar to the countdown to next step indicator 332). In one or more implementations, the digital assistant presents additional route information 414 and a selectable option 416 to switch from the user interface for the digital assistant to a map view, such as those illustrated in FIG. 3.

A digital assistant may be usable in connection with constrained-transportation directions in a variety of different ways without departing from the spirit or scope of the techniques described herein. By way of example and not limitation, a user traveling on a constrained-route vehicle may use a voice command to add an intermediate destination on the way to a previously entered destination, to simply request a destination while on the vehicle, to request a change of a previously entered destination to a different final destination, to indicate that the user missed a stop, and so on. The digital assistant may utilize functionality of the map navigation tool 110 to obtain constrained-transportation directions for the user, including determining initially that the user is currently onboard a constrained-route vehicle and collecting parameters that describe both operation of the current vehicle as well as vehicles of different lines that are useable to carry the user to an indicated destination. The digital assistant may then present the obtained directions to the user in a variety of different ways. Additional examples and details are discussed in relation to the following example procedures.

Example Procedures

To further illustrate, consider the discussion in this section of example procedures and implementation details related to constrained-transportation directions. The procedures discussed herein are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more servers, such as via a service provider 112 that maintains and provides access to a schedule service 118 and/or a mapping service 120 or otherwise. Aspects of the procedures may also be performed by a suitably configured device, such as the example computing device 102 of FIG. 1 that includes or makes use of a map navigation tool 110 and/or a client application module 108.

In general, functionality, features, and concepts described in relation to the examples above and below may be employed in the context of the example procedures described below. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 5:
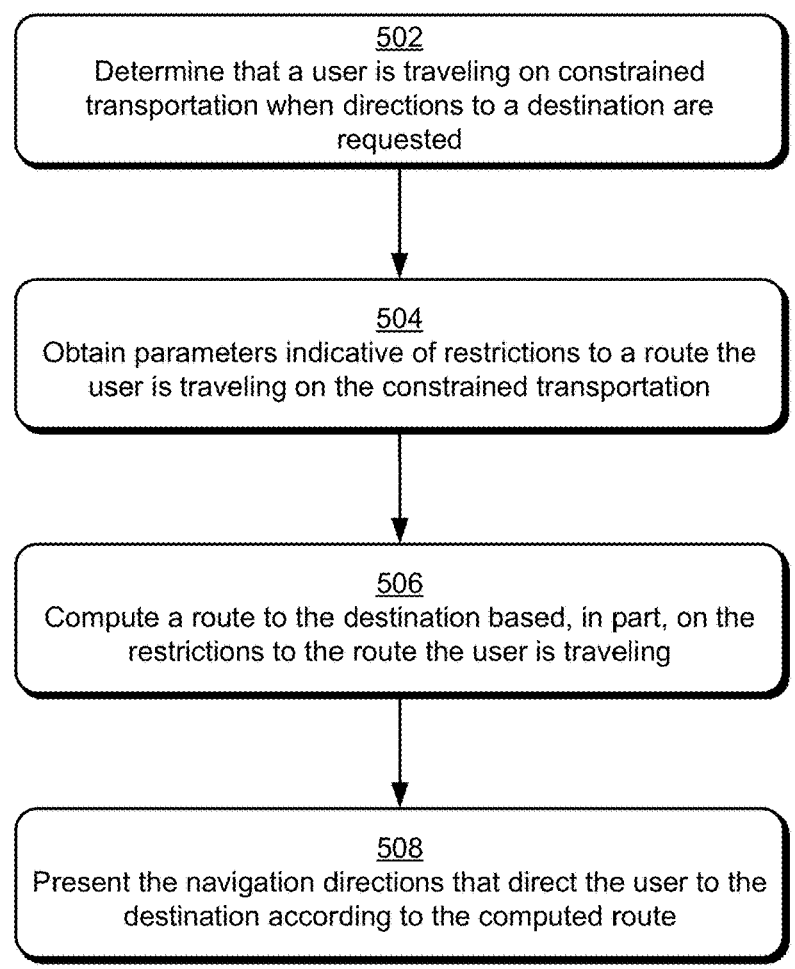
FIG. 5 is a flow diagram depicting an example procedure to deliver accurate constrained-transportation directions to a user in accordance with one or more implementations.

FIG. 5 depicts an example procedure 500 for delivering constrained-transportation directions to a user in accordance with one or more implementations. A determination is made that the user is traveling on constrained transportation when directions to a destination are requested (block 502). For example, the map navigation tool 110 determines that a user of the computing device is onboard a constrained-route vehicle (such as a transit vehicle having a designated route and predetermined stops) when a request is made for directions to a destination.

Responsive to the determination that the user is traveling on constrained transportation, parameters are obtained that are indicative of restrictions to a route the user is traveling on the constrained transportation (block 504). For example, the map navigation tool 110 obtains parameters indicative of a route being traveled by a constrained-route vehicle on which the user is a passenger. The parameters indicate restrictions such as a designated route to which the constrained-route vehicle is limited, stops along the route to which the constrained-route vehicle is limited, times at which the constrained-route vehicle stops at those stops, and so forth. The parameters can also describe a variety of other aspects of operation of the constrained-route vehicle as discussed above and below.

A route to the destination is computed based, in part, on the restrictions to the route the user is traveling (block 506). For example, the map navigation tool 110 computes the route to the destination based on the restrictions indicated by the obtained parameters. The map navigation tool 110 computes the route, for instance, to include at least a portion of the designated route the user is already traveling, and include an exit from the current constrained-route vehicle at one of its predetermined stops.

The navigation directions that direct the user to the destination according to the computed route are presented (block 508). For example, the map navigation tool 110 presents the user interface 111 via a display of the computing device 102. The user interface 111 includes directions that direct the user to the destination according to the route computed at block 506.

Figure 6:
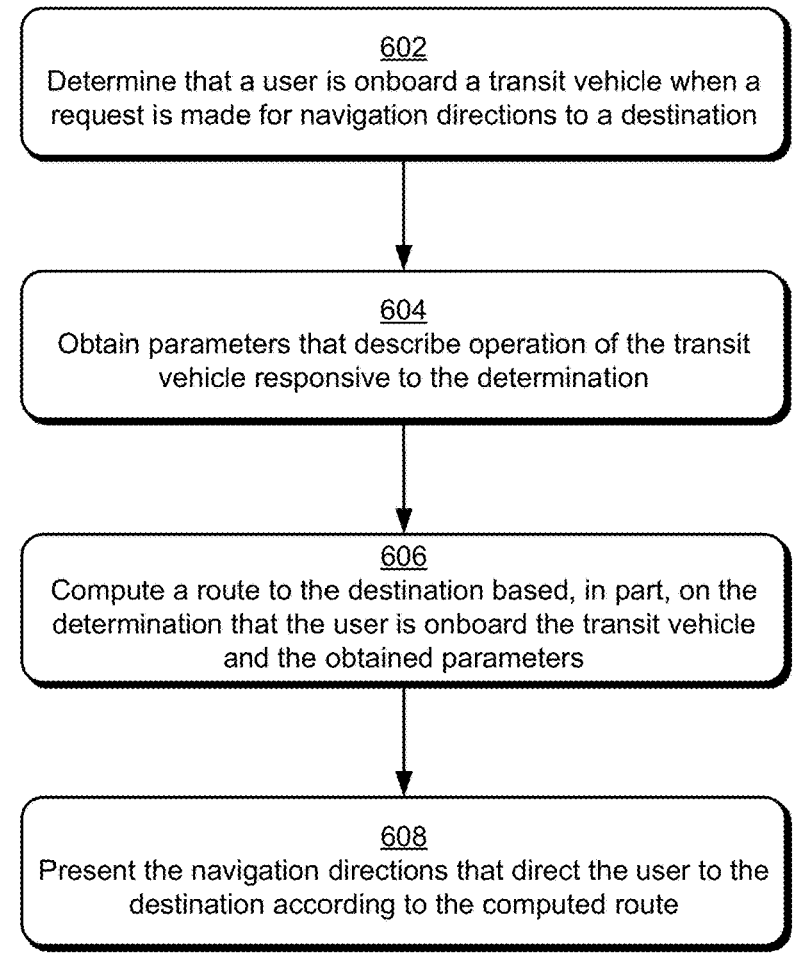
FIG. 6 is a flow diagram depicting an example procedure to deliver accurate on-transit directions to a user in accordance with one or more implementations.

FIG. 6 depicts an example procedure 600 for delivering on-transit directions to a user in accordance with one or more implementations. A determination is made that the user is onboard a transit vehicle when directions to a destination are requested (block 602). For example, the map navigation tool 110 determines that a user of the computing device 102 is onboard a transit vehicle when a request is made for directions to a destination. The user may, while on transit, request directions via the user interface 111 to an intermediate destination on the way to a previously entered destination, for instance. Alternately, the user may, while on transit, simply initiate a mapping application that makes use of the map navigation tool 110, and request directions via the user interface 111 to a destination without being on the way to a previously entered destination. In connection with the request for directions, the map navigation tool determines the user is onboard transit, such as by communicating with the transit vehicle the user is onboard, obtaining information from a service provider 112 indicating the user is onboard the transit vehicle, based on scanning a ticket for boarding the transit vehicle, by determining that movement of the user corresponds to being onboard a transit vehicle, and so forth.

Responsive to the determination that the user is onboard a transit vehicle, parameters are obtained that describe operation of the transit vehicle (block 604). For example, the map navigation tool 110 obtains parameters that describe operation of the transit vehicle the user is currently riding from one or both of the schedule service 118 and the schedule store 206. The obtained parameters describe a variety of characteristics for operation of the current transit vehicle as well as its corresponding transit line, such as locations of stops for the transit line, times vehicles of the line are scheduled to arrive at and depart from the stops, estimated travel duration between stops of the line, and so on. The obtained parameters are also capable of describing real-time operation characteristics of the current transit vehicle, such as timeliness relative to scheduled times, passenger load, temporary changes to stops being made (e.g., due to traffic, weather, or other conditions affecting travel), current fares, availability of amenities (e.g., Wi-Fi), and so forth. When computing a transit-based route that may involve transit vehicles in addition to the current vehicle, these parameters are also obtained for other transit vehicles that may be utilized to carry the user to the destination. Consequently, the map navigation tool 110 also collects the parameters for those other vehicles.

A route to the destination is computed based, in part, on the determination that the user is onboard the transit vehicle and the obtained parameters (block 606). For example, the map navigation tool 110 computes a route to the destination based on the determination made at block 602 that the user is onboard a transit vehicle. As discussed above, this determination indicates that the user is not simply standing still at the time directions are requested, and also that the user cannot simply walk, at the time the request is made, to nearby locations. Instead, the user is constrained to being a passenger on the current transit vehicle. Based on this knowledge, the map navigation tool 110 computes the route to account for an amount of time it will take for the computations to be performed and directions presented to the user. The map navigation tool 110 also accounts for where the current transit vehicle will have traveled during that time. In this way, the map navigation tool 110 can disregard stops the user passes or transfers the user misses while the computations are being performed. For instance, if the user is on a transit vehicle that is stopped at a station while the computations are being performed, and the amount of time it will take for the computations to be performed is longer than an amount of time the transit vehicle will be at the station, then that station may also be disregarded as a location for the user to exit the transit vehicle. The map navigation tool 110 can also disregard transfers the user may be unable to make by walking to those transfers at some predetermined, reasonable walking pace. In this way, the route is computed to utilize stops that are upcoming for the user's current transit vehicle, and transfers that the user can make from those upcoming stops. The route is also constrained to the operation of the transit vehicles as described by the collected parameters. In other words, the route is computed so that the user boards and exits the transit vehicles at stops specified for those vehicles.

Further, the map navigation tool 110 computes the route using the parameters collected for the transit vehicle the user is currently onboard. To compute the route, the map navigation tool 110 may also use the parameters collected for transit vehicles of other lines, a current location of the user, and a current time. Using these parameters and based on a starting point onboard the current transit vehicle, the map navigation tool 110 computes an optimized (e.g., fastest or shortest) route to the destination.

The navigation directions that direct the user to the destination according to the computed route are presented (block 608). For example, the map navigation tool 110 presents the user interface 111 via a display of the computing device 102. The user interface 111 includes directions that direct the user to the destination according to the route computed at block 606. The user interface may be configured in one or more of the modes illustrated in FIGS. 3-4 to present the directions, for instance. Further, the directions may direct the user on a per-step basis, such as by instructing the user to "continue on the current transit vehicle for 0.5 miles (approximately 5 minutes); exit the vehicle at the Pine & 4$^{th}$ stop; walk 0.1 miles east on Pine to the Pine & 5$^{th}$ stop; catch the '7' bus northbound (scheduled to arrive at 2:57 PM) . . . " The directions may be in the form of text, may be shown on a map with indications where the different steps are to be performed, and so on. The directions may include a variety of information to assist the user with following the determined route.

Figure 7:
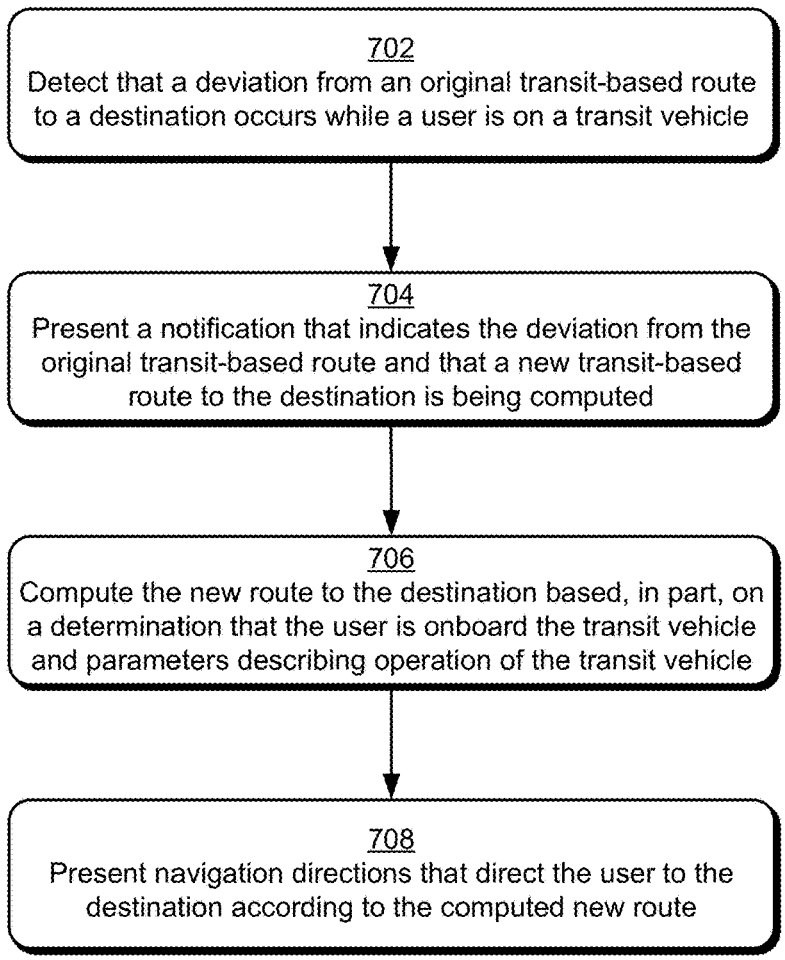
FIG. 7 is a flow diagram depicting an example procedure to detect a deviation from an original transit-based route and compute a new route for the user in accordance with one or more implementations.

FIG. 7 depicts an example procedure 700 for detecting a deviation from an original transit-based route and computing a new route for the user in accordance with one or more implementations. A deviation from an original transit-based route to a destination is detected while a user is on a transit vehicle (block 702). For example, the map navigation tool 110 detects that the user misses a stop, which directions corresponding to the original transit-based route, instructed the user to take. In another example, the map navigation tool 110 receives an input from the user to stop at an intermediate destination while on the original transit based route to the original destination. A deviation from the original transit-based route may be detected responsive to a variety of other events occurring without departing from the spirit or scope of the techniques describe herein. By way of example and not limitation, a deviation may be detected responsive to traffic or weather conditions that slow down the transit vehicle the user is currently onboard, causing the user to miss a transfer to another line. The deviation may also be detected responsive to a transit vehicle of another line being ahead of schedule and departing early from a stop along the original transit-based route. A deviation may also be detected for other reasons.

A notification is presented that indicates the detected deviation and that a new transit-based route to the destination is being computed (block 704). For example, the map navigation tool 110 presents the user interface 111 to indicate that a deviation has been detected (e.g., "You missed your stop) and that a new transit based route to the destination is being computed, as in the example 400 of FIG. 4. Additionally, based on detection of the deviation a request for new directions to the destination can be automatically generated.

A new route to the destination is computed based, in part, on a determination that the user is onboard the transit vehicle and parameters that describe operation of the transit vehicle (block 706). For example, the map navigation tool 110 may have determined in conjunction with computing the original transit-based route that the user of the computing device 102 is onboard the transit vehicle. The map navigation tool 110 may also have collected parameters describing operation of the current transit vehicle when computing the original transit-based route. Alternately or additionally, the map navigation tool 110 may make the determination and request the parameters responsive to detecting the deviation from the original transit-based route. Regardless of when the determination is made and the parameters are obtained, the map navigation tool 110 uses the determination and the obtained parameters to compute the new route. The map navigation tool 110 uses the determination, as described above in the discussion of FIG. 6, to initiate calculations of the new route from a position onboard a transit vehicle, rather than from some static position. The map navigation tool 110 uses the parameters describing operation of the current transit vehicle along with a current location of a user, a current time, and parameters describing transit vehicles on other lines to compute the new transit-based route to the destination.

Navigation directions are presented that direct the user to the destination according to the computed new route (block 708). For example, the map navigation tool 110 presents the user interface 111 via the display of the computing device 102. In particular, the map navigation tool 110 configures the user interface to include one or more instructions that direct the user to the destination according to the new route computed at block 706. The map navigation tool 110 can present the navigation directions when the user interface 111 is configured for a map application as in FIG. 3 or when configured for a digital assistant as in FIG. 4. Directions that direct the user to a destination according to a newly computed transit-based route may be presented to the user in a variety of other ways without departing from the spirit or scope of the techniques described herein. By way of example and not limitation, the directions can, in addition to the types of directions discussed above, instruct the user when and where to perform transit-specific activities, such as to instruct the user to depart the transit vehicle at a next stop, request a stop, continue on the transit vehicle, board a particular transit vehicle, wait for a transit vehicle on a different line, and so on.

Having described example procedures and details in accordance with one or more implementations, consider now a discussion of example systems and devices that can be utilized to implement the various techniques described herein.

Example System and Device

Figure 8:
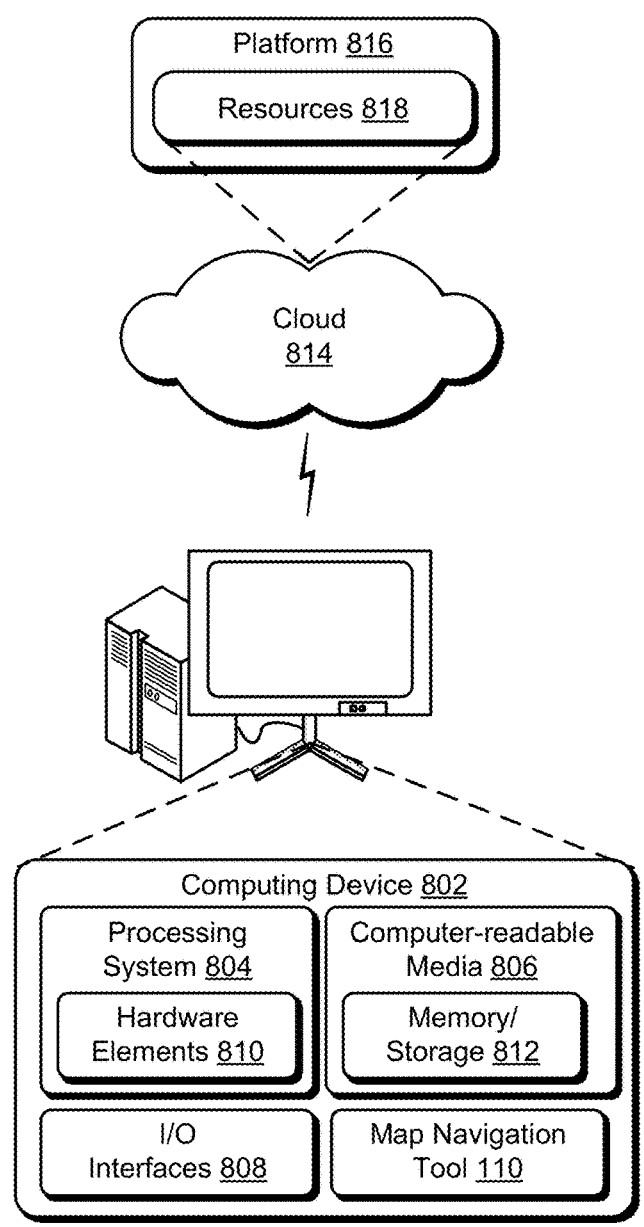
FIG. 8 illustrates an example system including various components of an example device that can be employed for one or more implementations of the techniques described herein.

FIG. 8 illustrates an example system generally at 800 that includes an example computing device 802 that is representative of one or more computing systems and/or devices that may implement the various techniques described herein. This is illustrated through inclusion of the map navigation tool 110, which operates as described above. The computing device 802 may be, for example, a server of a service provider, a device associated with a client (e.g., a client device), an on-chip system, and/or any other suitable computing device or computing system.

The example computing device 802 is illustrated as including a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combinations thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Example Implementations

Example implementations of techniques described herein include, but are not limited to, one or any combinations of one or more of the following examples:

EXAMPLE 1

A method implemented by a computing device for providing accurate navigation directions, the method comprising: determining that a user is traveling on constrained transportation when navigation directions to a destination are requested; obtaining parameters indicative of restrictions to a route the user is traveling on the constrained transportation; computing a route to the destination based, in part, on the restrictions to the route the user is traveling; and presenting the navigation directions that direct the user to the destination according to the computed route.

EXAMPLE 2

A method as described in example 1, further comprising receiving a user input to request the navigation directions to the destination.

EXAMPLE 3

A method as described in example 1, further comprising receiving an automatically generated request for the navigation directions to the destination responsive to detecting a deviation from an original route.

EXAMPLE 4

A method as described in example 1, wherein the route the user is traveling on the constrained transportation follows a designated path and the parameters describe the designated path.

EXAMPLE 5

A method as described in example 1, wherein the route the user is traveling on the constrained transportation includes at least one predefined stop and the parameters describe a location of the at least one predefined stop.

EXAMPLE 6

A method as described in example 1, wherein the parameters describe real-time operation characteristics of a vehicle corresponding to the constrained transportation.

EXAMPLE 7

A method as described in example 5, wherein the real-time operation characteristics include at least one of: a current location of the vehicle; timeliness relative to a corresponding schedule; a passenger load; current fare for the vehicle; and amenities of the vehicle.

EXAMPLE 8

A method as described in example 1, wherein the parameters are indicative of a schedule that indicates when the constrained transportation is scheduled to stop at different locations along the route the user is traveling.

EXAMPLE 9

A method as described in example 1, further comprising: obtaining parameters indicative of restrictions of routes of other constrained transportation that can be utilized to carry the user to the destination; and computing the route to the destination based further on the restrictions of the routes of the other constrained transportation.

EXAMPLE 10

A method as described in example 1, further comprising computing the route to the destination based on optimization of an optimization factor.

EXAMPLE 11

A method as described in example 10, further comprising computing the route to the destination based on optimization for: time effective to compute a fastest route to the destination according to the obtained parameters; or distance effective to compute a shortest route to the destination according to the obtained parameters.

EXAMPLE 12

A method as described in example 1, wherein the computed route is transit-based to include at least one of: continuing as a passenger on a transit vehicle; exiting the transit vehicle; walking to at least one waypoint of the computed route; boarding another transit vehicle; and exiting the other transit vehicle.

EXAMPLE 13

A device comprising: a map data store to maintain map data that is accessible for display by the device in connection with presenting navigation directions;
a schedule store to maintain schedule data that describes operation of constrained-route vehicles and is accessible for computing a route that utilizes the constrained-route vehicles to carry a user to a destination; and computer readable media having instructions stored thereon that are executable by the device to implement a map navigation tool to perform operations for providing accurate navigation directions, the operations comprising: responsive to a request for directions to a destination, determining whether a user is onboard a constrained-route vehicle; computing a route to the destination based in part, on a determination that the user is onboard the constrained-route vehicle and utilizing at least some of the schedule data obtained from the schedule store, the computing accounting for the user being onboard the constrained-route vehicle at a start of the route; and presenting the navigation directions via the display in a user interface, the navigation directions directing the user to the destination according to the computed route, and the user interface including at least some of the map data from the map data store.

EXAMPLE 14

A device as described in example 13, wherein the map navigation tool is utilized by a map application of the device to provide the navigation directions.

EXAMPLE 15

A device as described in example 13, wherein the map navigation tool is utilized by a digital assistant of the device to provide the navigation directions.

EXAMPLE 16

A device as described in example 13, wherein the user interface comprises a map view with one or more indications overlaying the map that represent waypoints of the navigation directions.

EXAMPLE 17

A device as described in example 13, wherein the operations further comprise updating at least one of the map data store or the schedule store while traveling along the route with new data that is usable to update the navigation directions presented.

EXAMPLE 18

A method implemented by a computing device for assisting a user riding a constrained-route vehicle that deviates from an originally computed route, the method comprising: detecting that a deviation from an original constrained-transportation route to a destination occurs while the user is onboard a constrained-route vehicle; automatically computing a new constrained-transportation route to the destination based, in part, on a determination that the user is onboard the constrained-route vehicle and parameters describing operation of the constrained-route vehicle, the new constrained-transportation route computed to account for the user being onboard the constrained-route vehicle at a start of the new constrained-transportation route and constrained to the operation of the constrained-route vehicle; and presenting navigation directions that direct the user to the destination according to the new constrained-transportation route.

EXAMPLE 19

A method as described in example 18, further comprising presenting a notification that indicates the deviation from the original constrained-transportation route.

EXAMPLE 20

A method as described in example 18, wherein the deviation corresponds to a missed stop where directions corresponding to the original constrained-transportation route direct the user to exit the constrained-route vehicle.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by a client computing device for providing accurate navigation directions, the client computing device configured to receive data from at least a service provider server over a network, the method comprising:
   determining, by a processor of the client computing device, based on location data determined via a local component of the client computing device, that a user is traveling on a constrained transportation vehicle that is moving at a time when navigation directions to a destination are requested;
   by the processor, invoking at least one resource service of the service provider server:
   receiving information from the invoked resource service of the service provider server at the processor, the information including parameters indicative of restrictions to a known route the user is traveling on the constrained transportation vehicle, the restrictions including the constrained transportation vehicle restricted to following the known route and predetermined stops;
   in memory of the client computing device, storing the parameters for access by the processor;
   computing, by the processor, an initial route to the destination based on the user traveling on moving constrained transportation at a start of the initial route and the restrictions to the known route the constrained transportation vehicle is restricted to follow, the initial route to the destination further computed based on an assumption that the start of the initial route is a non-static location from which the user cannot control the traveling, the initial route stored in the memory of the client computing device;
   by the processor and using location data, detecting a deviation from the initial route;
   from the service provider server and the memory of the client computing device, collecting the parameters of the constrained transportation vehicle and parameters of other constrained transportation vehicles that are configured to carry the user to the destination;
   based on detecting the deviation, by the processor, programmatically recalculating with the collected parameters of the constrained transportation vehicle and of the other constrained transportation vehicles the route to the destination, the recalculated route including at least one vehicle of the other constrained transportation vehicles;
   generating, by the processor, digital content indicative of the navigation directions to direct the user to the destination according to the recalculated route; and
   outputting, by the processor, the digital content via the client computing device to present the navigation directions.

2. A method as described in claim 1, further comprising receiving a user input to request the navigation directions to the destination.

3. A method as described in claim 1, further comprising receiving an automatically generated request for the navigation directions to the destination responsive to detecting the deviation from the known route.

4. A method as described in claim 1, wherein the known route the user is traveling on the constrained transportation vehicle follows a designated path and the parameters describe the designated path.

5. A method as described in claim 1, wherein the known route the constrained transportation vehicle is restricted to following includes at least one predefined stop and the parameters describe a location of the at least one predefined stop.

6. A method as described in claim 1, wherein the parameters describe real-time operation characteristics of the constrained transportation vehicle.

7. A method as described in claim 6, wherein the real-time operation characteristics include at least one of:
   a current location of the constrained transportation vehicle;
   timeliness relative to a corresponding schedule;
   a passenger load;
   current fare for the constrained transportation vehicle; and
   amenities of the constrained transportation vehicle.

8. A method as described in claim 1, wherein the parameters are indicative of a schedule that indicates when the constrained transportation vehicle is scheduled to stop at different locations along the known route the constrained transportation vehicle is restricted to following.

9. A method as described in claim 1, further comprising computing the route to the destination based on optimization of an optimization factor.

10. A method as described in claim 9, further comprising computing the route to the destination based on optimization for:
   time effective to compute a fastest route to the destination according to the parameters; or
   distance effective to compute a shortest route to the destination according to the parameters.

11. A method as described in claim 1, wherein the digital content is configured to present the navigation directions from a view comprising at least one of a three-dimensional (3D) view, a bird's eye view, or an animated view.

12. A client device configured to receive data from at least a service provider server over a network, the client device comprising:
   a map data store of the client device to maintain map data that is accessible for display by the client device in connection with presenting navigation directions;
   a schedule store of the client device to maintain schedule data that describes operation of constrained transportation vehicles and is accessible for computing a route that utilizes the constrained transportation vehicles to carry a user to a destination; and
   computer readable media of the client device having instructions stored thereon that are executable by the client device to implement a map navigation tool to perform operations for providing accurate navigation directions, the operations comprising, at a processor of the client device:
      responsive to a request for directions to the destination, determining whether the user is traveling on a constrained transportation vehicle that is moving at a time of the request based on location data determined via a local component of the client device, the constrained transportation vehicle having restrictions including following a known route;
      invoking at least one resource service of the service provider server;
      receiving information from the invoked resource service of the service provider server, the information including parameters indicative of the restrictions of the constrained transportation vehicle following the known route;

in at least the schedule store, storing the parameters for access by the processor;

computing an initial route to the destination based on the user traveling on moving constrained transportation at a start of the initial route and the restrictions to the known route utilizing at least some of the schedule data obtained from the schedule store, the initial route to the destination further computed based on an assumption that the start of the initial route is a non-static location from which the user cannot control the traveling, the initial route stored in the computer readable media of the client device;

detecting a deviation from the initial route using location data;

from the service provider server and at least the schedule store of the client device, collecting the parameters of the constrained transportation vehicle and parameters of other constrained transportation vehicles that are configured to carry the user to the destination;

based on detecting the deviation, programmatically recalculating with the collected parameters of the constrained transportation vehicle and of the other constrained transportation vehicles the route to the destination, the recalculated route including at least one vehicle of the other constrained transportation vehicles;

generating digital content indicative of the navigation directions that direct the user to the destination according to the recalculated route; and outputting the digital content via a display of the client device in a user interface to present the navigation directions.

13. A device as described in claim 12, wherein the map navigation tool is utilized by a map application of the client device to provide the navigation directions.

14. A device as described in claim 12, wherein the map navigation tool is utilized by a digital assistant of the client device to provide the navigation directions.

15. A device as described in claim 12, wherein the user interface comprises a map view with one or more indications overlaying a map that represent waypoints of the navigation directions.

16. A device as described in claim 12, wherein the operations further comprise updating at least one of the map data store or the schedule store while traveling along the computed route with new data that is usable to update the navigation directions displayed in the user interface.

17. A method implemented by a client computing device configured to receive data from at least a service provider server over a network for assisting a user riding a constrained transportation vehicle that deviates from an originally computed route, the method comprising:

determining, by a processor of the client computing device, based on location data determined via a local component of the client computing device, that the user is riding on the constrained transportation vehicle;

via the processor, invoking at least one resource service of the service provider server:

receiving information from the invoked resource service of the service provider server at the processor, the information including parameters indicative of restrictions to a known route the user is traveling on the constrained transportation vehicle;

in memory of the client computing device, storing the parameters for access by the processor;

detecting, by the processor and using location data, that a deviation from an original constrained transportation route to a destination occurs while the user is onboard the constrained transportation vehicle;

automatically, at the processor, from the service provider server and the memory of the client computing device, collecting the parameters of the constrained transportation vehicle and parameters of other constrained transportation vehicles that are configured to carry the user to the destination;

at the processor, automatically programmatically recalculating, with the collected parameters of the constrained transportation vehicle and of the other constrained transportation vehicles, a new constrained transportation route to the destination based, in part, on a determination that the user is onboard the constrained transportation vehicle, the new constrained-transportation route further computed based on an assumption that a start of the new constrained transportation route is a non-static location from which the user cannot control the traveling;

generating, by the processor, digital content indicative of navigation directions that direct the user to the destination according to the new constrained transportation route; and outputting, by the processor, the digital content via the client computing device to present the navigation directions.

18. A method as described in claim 17, further comprising outputting a notification that indicates the deviation from the original constrained transportation route.

19. A method as described in claim 17, wherein the deviation corresponds to a missed stop where directions corresponding to the original constrained transportation route direct the user to exit the constrained transportation vehicle.

* * * * *